United States Patent [19]
Miranti, Jr.

[11] 4,255,147
[45] Mar. 10, 1981

[54] WRAPPED-MOLDED V-BELT AND METHOD OF MANUFACTURE

[75] Inventor: Joseph P. Miranti, Jr., Nixa, Mo.

[73] Assignee: Dayco Corporation, Dayton, Ohio

[21] Appl. No.: 92,307

[22] Filed: Nov. 8, 1979

[51] Int. Cl.³ .................... F16G 5/08; B29H 7/22
[52] U.S. Cl. ................................. 474/262; 156/141; 474/263
[58] Field of Search ............ 474/259, 261, 262; 156/141, 137, 139, 172, 185, 189, 213; 198/844, 847

[56] References Cited

U.S. PATENT DOCUMENTS

| | | | |
|---|---|---|---|
| 1,906,397 | 5/1933 | Meyer | 156/141 |
| 1,939,859 | 12/1933 | Matthias | 156/141 X |
| 1,970,509 | 8/1934 | Wein et al. | 474/262 |
| 2,392,373 | 1/1946 | Freedlander | 474/252 X |
| 2,414,822 | 1/1947 | Lindsay et al. | 474/260 |
| 2,582,366 | 1/1952 | White | 474/261 |
| 2,608,874 | 9/1952 | Waugh | 474/261 X |
| 2,661,045 | 12/1953 | Huber | 474/262 X |
| 2,822,856 | 2/1958 | Waugh | 156/139 |
| 3,924,482 | 12/1975 | Meadows | 474/262 X |
| 4,131,030 | 12/1978 | White, Jr. | 474/262 |

FOREIGN PATENT DOCUMENTS 236324 7/1925 United Kingdom .
1326670 8/1973 United Kingdom .

*Primary Examiner*—C. J. Husar
*Assistant Examiner*—Conrad Berman
*Attorney, Agent, or Firm*—Charles E. Bricker

[57] ABSTRACT

A wrapped, molded belt, and a method for making the same, are provided wherein the belt has a cover made from cord fabric. The angle of the strength cords of the cord fabric is different from the angle of the cords on the sides of the belt. The belt is produced by wrapping a desired width of cord fabric around a belt body, skewing the cords a desired amount and in a desired direction, depending upon which face of the belt body is being covered, and finally, curing the belt.

27 Claims, 6 Drawing Figures

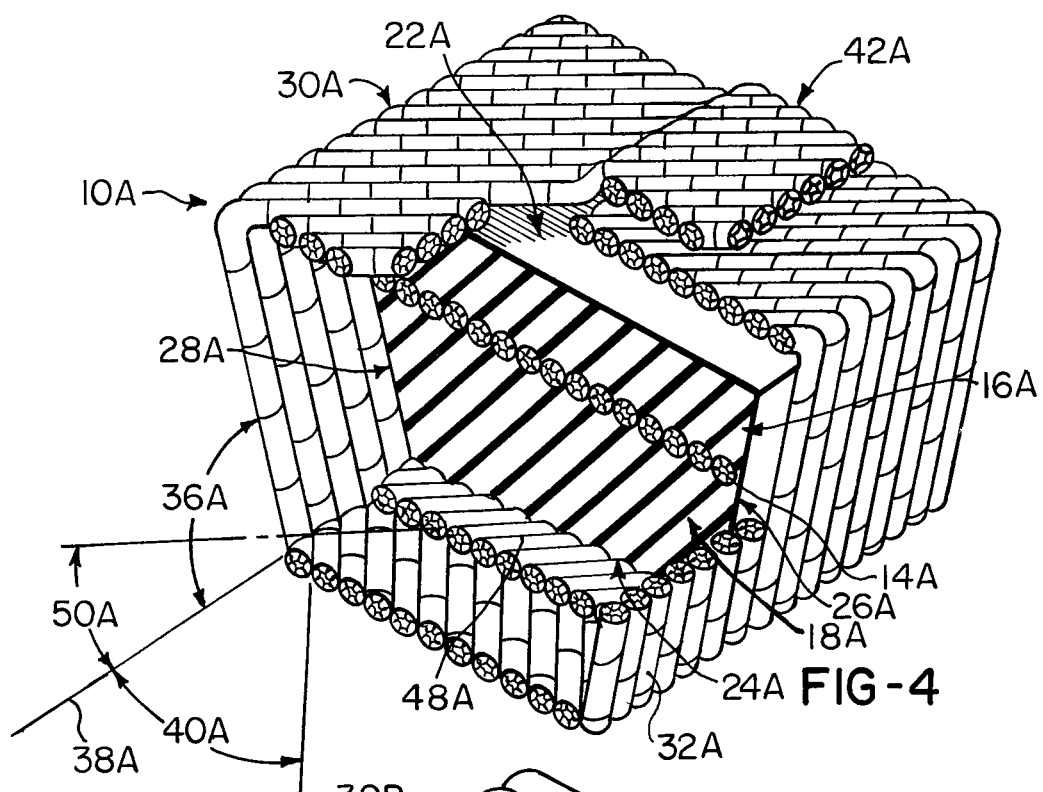
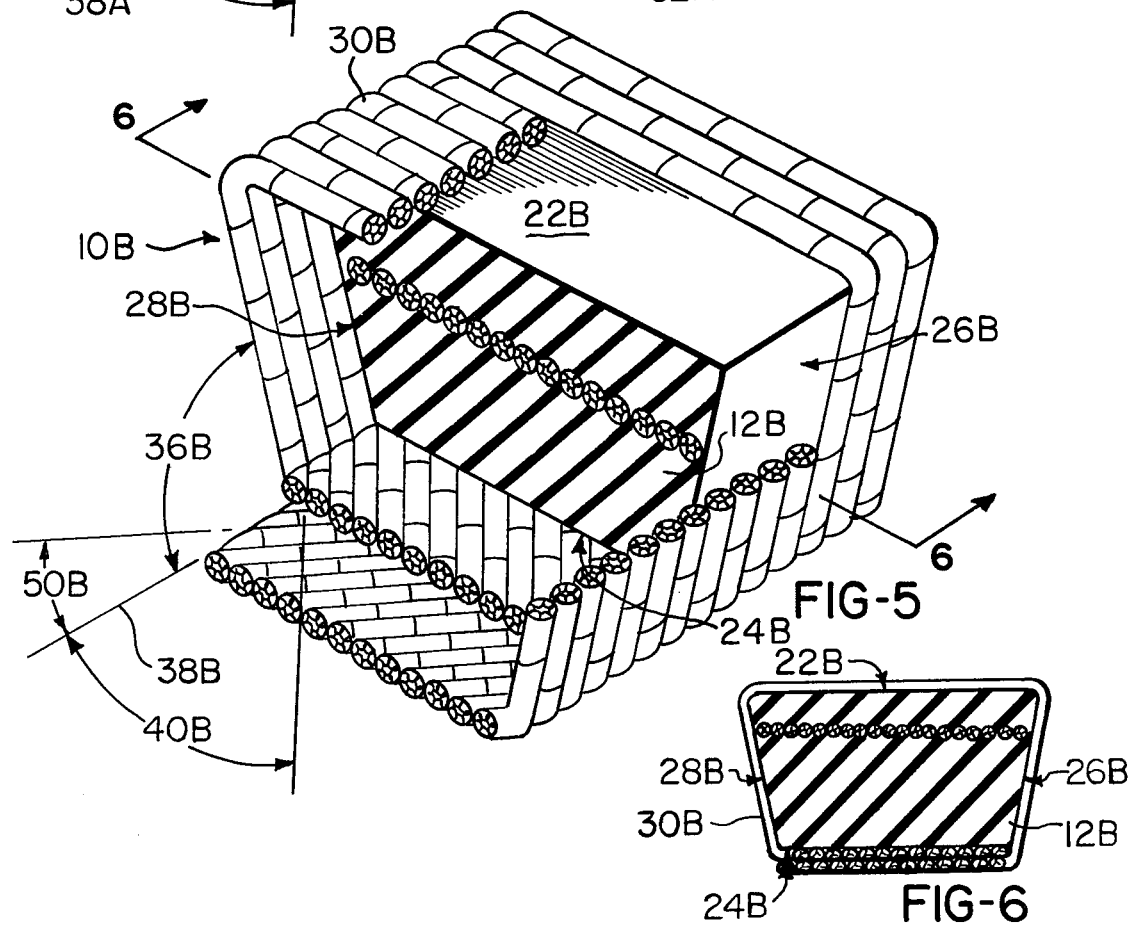

WRAPPED-MOLDED V-BELT AND METHOD OF MANUFACTURE

BACKGROUND OF THE INVENTION

This invention relates to endless power transmission belts, and particularly to endless V-belts.

It is known in the art to provide a woven fabric cover on an endless power transmission belt body. Such cover is disposed on the bias so that the warp and weft threads are arranged at an angle with respect to the longitudinal axis of the belt. Belts having one or more bias-cut fabric covers are shown in U.S. Pat. Nos. 2,392,373, 2,414,822 and 2,661,045.

It is also known to provide an endless power transmission belt having an outer cover formed from a cord material with adjacent turns of the cord material being held together by rubber or a rubber-like binder. British Pat. No. 236,324 discloses a flat belt having an outer cover formed from a cord material wrapped transversely around the belt. U.S. Pat. Nos. 1,970,509 and 2,582,366 each disclose V-type belts having outer covers formed from a cord material, wherein the cord material may be wrapped transversely or at an oblique angle around the belt, relative to its longitudinal axis. U.S. Pat. No. 4,131,030 discloses a V-type belt having two cord fabric cover layers, wherein the strength cords in each layer extend in opposite directions.

It is known that by having the cords of a cord material extending transversely around a belt, a maximum of flexibility is provided. It is also known that by having such cords extending obliquely around a belt, a maximum resistance to cracking is provided. What is desired, therefore, is a belt having the flexibility inherent in a transversely covered belt and the crack resistance of a bias covered belt.

Accordingly, it is an object of the present invention to provide a novel V-type endless power transmission belt having a cover made from a cord fabric.

Another object of the present invention is to provide a method for producing a novel V-belt.

Other objects, aspects and advantages of the present invention will become apparent to those skilled in the art from the following description of the invention.

SUMMARY OF THE INVENTION

In accordance with the present invention, there is provided a V-belt having a cover made from a cord fabric wherein the strength cords along each of the parallel sides and the top of the belt extend at substantially the same first angle relative to the longitudinal axis of the belt, and the strength cords along the bottom of the belt extend at a second, and different, angle relative to the longitudinal axis.

Also provided in accordance with the present invention is a method for making a V-belt, as described above, which comprises wrapping a belt body by applying a width cord fabric to the top of the belt with the strength cords disposed at the first angle, continuing to apply the fabric to one side with the said cords disposed at the first angle, pulling the fabric in shear to the said second angle and applying the fabric to the bottom of the belt with the cords disposed at the second angle, pulling the fabric in shear to the first angle and applying the remainder of the width to the remaining side and to the top of the belt body with the cords disposed at the first angle, and vulcanizing, or otherwise curing, the resulting wrapped belt body.

BRIEF DESCRIPTION OF THE DRAWING

In the drawing,

FIG. 4 is a perspective view with parts broken away and parts in section, illustrating another embodiment of the belt of this invention;

FIG. 5 is a perspective view, with parts broken away and parts in section, illustrating yet another embodiment of the belt of this invention; and FIG. 6 is a cross-section taken along lines 6—6 of FIG. 5.

DETAILED DESCRIPTION OF THE DRAWING

Figure 1:
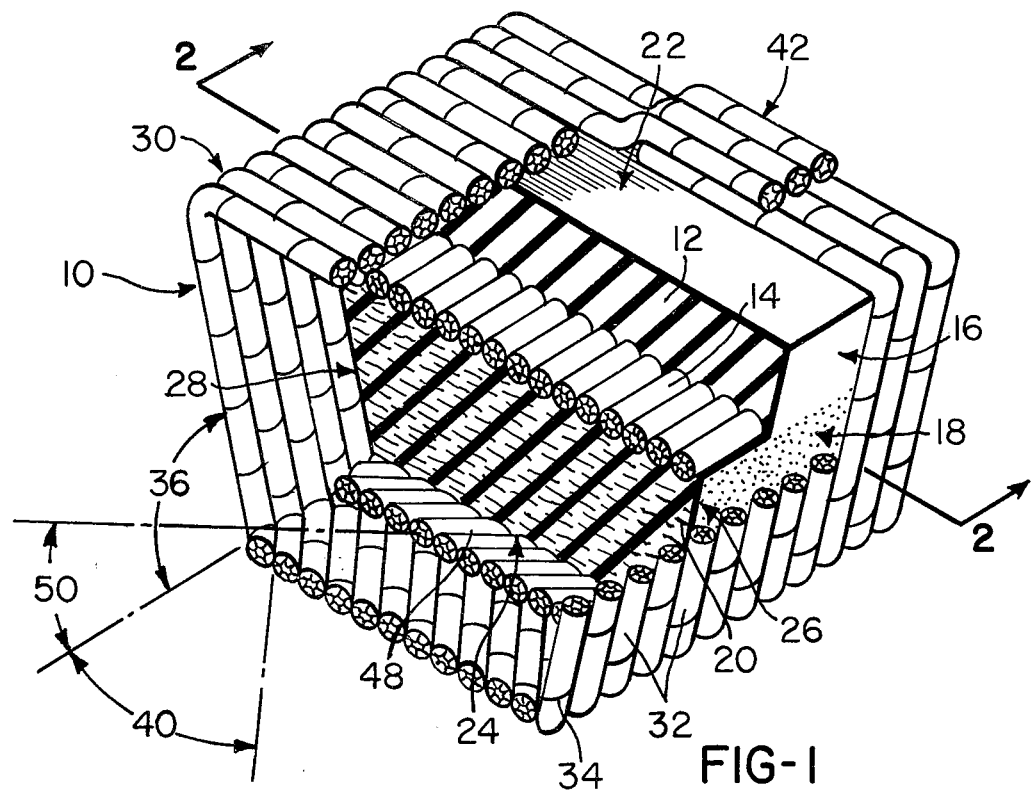
FIG. 1 is a perspective view, with parts broken away and parts in section illustrating the belt of this invention.
Figure 2:
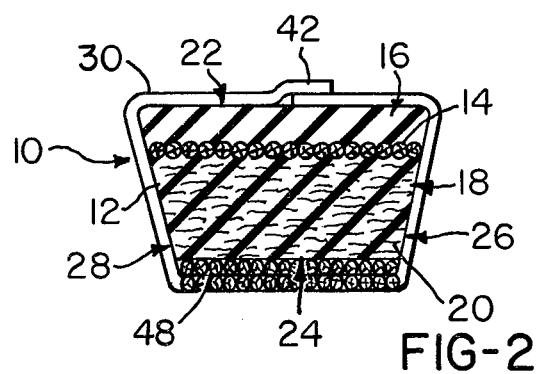
FIG. 2 is a cross-section taken along lines 2—2 of FIG. 1.

Referring now to the drawing, and in particular to FIGS. 1 and 2, the belt of this invention is designated generally by the general numeral 10. The belt 10 comprises a belt body 12 made primarily of elastomeric material and having a load-carrying section made from a continuous, helically-wound load-carrying cord 14, a tension section 16 and a compression section 18. The elastomeric material in the compression section may have a plurality of discrete fibers uniformly dispersed therethrough. A representative few of these fibers are shown and are designated generally the reference numeral 20.

The belt 10 is known in the art as a V-belt. The trapezoidal cross-section of the belt may be symmetrical, as shown, or asymmetrical. The belt has a top 22 which is wider than and parallel with a bottom 24, and non-parallel sides 26 and 28.

The belt 10 is provided with a cover 30 made from tire cord which comprises a plurality of strong parallel cords 32 and may also comprise relatively weak weft threads 34 which are used to hold the cords 32 in place during the process of making the cover 30. The weak tie threads 34 are intended to break in service and have no function after the belt is made.

The belt 10 may be made as follows: A belt body 12 is provided in a conventional manner. The cord fabric is prepared by calendering or otherwise applying an elastomeric material to at least one and generally both sides thereof. The cord fabric is then cut into strips of a desired width, with the strength cords 32 running perpendicular to the length of the strip.

The cover 30 is applied to the belt body 12 by wrapping the cord fabric at a first angle 36 about the top 22 and one side 26 of the body 12, with respect to a longitudinal axis 38 of the body 12. Prior to wrapping the cord fabric around the bottom 24 of the body 12, the fabric is pulled in shear so that the cords 32 are at a second angle 40 with respect to the axis 38. The fabric, held at the angle 40, is then applied to the bottom 24 of the belt. The cord fabric is once again pulled in shear, but in the opposite direction, so that the cords 32 are once again at an angle 36 relative to the axis 38, and wrapping is continued around the side 28 and the top 30, where the remainder of the width of fabric is lapped over the first portion, as shown at 42.

Figure 3:
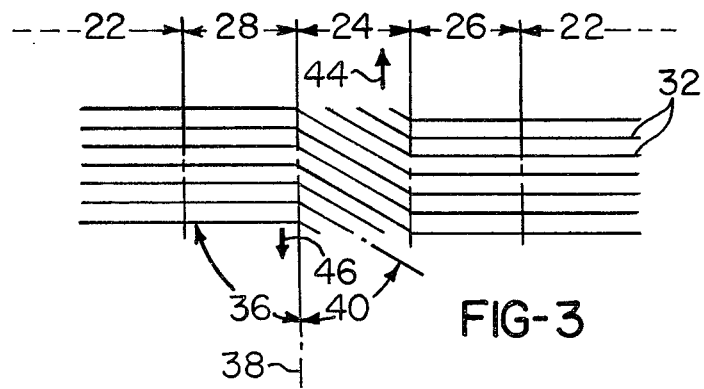
FIG. 3 illustrates the lay of the multiple cords of the cover fabric when all sides are viewed simultaneously.

The wrapping process may be better understood by reference to FIG. 3 which illustrates the lay of the cords 32 as if bottom 24, sides 26 and 28 and the top 30 of the belt 10 could be viewed simultaneously. The arrow designated 44 indicates pulling of the fabric in shear to displace the cords 32 to an angle 40 relative to the axis 38, and the arrow designated 46 indicates pulling of the fabric in shear, in the opposite direction to displace the cords to an angle 36.

In the embodiment illustrated in FIGS. 1 and 2, the cords 32 are shown placed at a first angle 36 of about 90 degrees, relative to the axis 38 and at a second angle 40 which may be in the approximate range of 10 to 80 degrees relative to the axis 38; preferably the angle 40 is in the approximate range of 30 to 60 degrees, and more preferably the angle 40 is about 45 degrees.

It is also within the scope of this invention to cover the belt 10 by placing the cord fabric so that the cords 32 lie along the top 30 and the sides 26 and 28 at a first angle in the approximate range of 10 to 80 degrees, preferably about 30 to 60 degrees, and more preferably about 45 degrees; and along the bottom 24 at a second angle of about 90 degrees.

Optionally, the belt 10 can have a layer 48 of cord fabric located between the bottom 24 of the body 12 and the cover 30. The cords 32 of the layer 48 are preferably oriented at an angle 50 which is of about the same magnitude, but opposite in direction to the angle 40, relative to the axis 38.

Other exemplary embodiments of the belt of this invention are illustrated in FIGS. 4-6. The belt construction illustrated in FIGS. 4-6 are very similar to the belt 10; therefore, such belt construction will be designated by the reference numerals 10A and 10B, respectively, and representative parts of each belt construction which are similar to corresponding parts of the belt 10 will be designated by the belt 10, followed by the letter designation A or B, and not described again in detail.

Referring to FIG. 4, it is also within the scope of this invention to skew the cords 32A on the top 22A of the belt 10A at an angle 50A which is from about 10 to about 80 degrees different from the angle 36A of the cords 32A along the sides 26A and 28A. The cords 32A on the top 22A of the belt, wrapped over from the sides 26A and 28A may also be disposed in opposing directions.

Referring now to FIGS. 6 and 7, the belt 10B differs from the belt 10 in that the ends of the cover 30B are overlapped on the bottom 24B of the belt 10B rather than on the top 22B. The belt 10B is made by applying the cord fabric first to the bottom 24B of the belt, with the cords 32B oriented at an angle 40B relative to the axis 38B, pulling the fabric in shear so that the cords 32B are disposed at an angle 36B and applying the fabric to the side 28B, continuing to apply the fabric to the top 22B and the side 26B, pulling the fabric in shear so that the cords 32B are disposed at the angle 50B and applying the remainder of the width of fabric to the bottom 24B, overlapping the first layer of cord fabric.

Following the covering steps, the belt is vulcanized, or otherwise cured, in a conventional manner.

The belt of this invention can be made of any suitable elastomeric material, including natural rubber, synthetic rubber, or any suitable plastic material, or mixtures or blends thereof.

As used herein and in the claims, the term "V-belt" includes belts having parallel tops and bottoms, as illustrated and described above, belts having an arched top and/or bottom, and toothed, or so-called "cog" belts.

Reasonable variations and modifications, which will be apparent to those skilled in the art, can be made in this invention without departing from the spirit and scope thereof.

I claim:

1. An endless power transmission belt having a trapezoidal cross-section comprising a belt body and a cord fabric cover layer, said cord fabric comprising a plurality of substantially parallel strength cords, said cover layer surrounding said belt body, having an overlap, and bonded thereto, wherein said strength cords along each of the nonparallel sides extend at substantially the same first angle relative to the longitudinal axis of said belt, and said strength cords along the bottom of said belt extend at a second angle relative to said longitudinal axis, wherein said second angle is different from said first angle.

2. The belt of claim 1 wherein said overlap is on the top side of said belt.

3. The belt of claim 2 further comprising an additional layer of said cord fabric between said cover fabric and the bottom of said belt.

4. The belt of claim 1 wherein said overlap is on the bottom side of said belt.

5. The belt of claim 1 wherein said first angle is approximately 90 degrees.

6. The belt of claim 5 wherein said second angle is in the approximate range of 10 to 80 degrees.

7. The belt of claim 5 wherein said second angle is in the approximate range of 30 to 60 degrees.

8. The belt of claim 5 wherein said second angle is about 45 degrees.

9. The belt of claim 1 wherein said second angle is about 90 degrees.

10. The belt of claim 9 wherein said first angle is in the approximate range of 10 to 80 degrees.

11. The belt of claim 9 wherein said first angle is in the approximate range of 30 to 60 degrees.

12. The belt of claim 9 wherein said first angle is about 45 degrees.

13. A method for making an endless power transmission belt having a trapezoidal cross-section comprising a belt body and a cord fabric cover layer, said cord fabric comprising a plurality of substantially parallel strength cords and a plurality of weak tie strands holding said strength cords in parallel relation, said cover layer surrounding said belt body with an overlap and bonded thereto, which comprises the steps of providing a belt body having a trapezoidal cross-section, providing a cord fabric having a layer of elastomeric material calendered to at least one side thereof, wrapping said belt body with a continuous width of said fabric by applying said fabric to the top of said belt with said strength cords disposed at a first angle to the longitudinal axis of said belt, continuing to apply said fabric to one side of said belt with said strength cords disposed at said first angle, pulling said fabric in shear whereby said strength cords are disposed at a desired second angle to said longitudinal axis and applying said fabric to the bottom of said belt with said strength cords disposed at said second angle, pulling said fabric in shear to said first angle and applying said fabric to the second side of said belt with said strength cords disposed at said first angle, and completing the wrapping of said belt body by applying the remainder of said width to the top of said belt with said strength cords disposed at said first angle; and curing the resulting wrapped belt body.

14. The method of claim 13 further comprising the step of applying a layer of cord fabric to the bottom of said belt body prior to wrapping said continuous width of said fabric therearound.

15. The method of claim 13 wherein said first angle is approximately 90 degrees.

16. The method of claim 15 wherein said second angle is in the approximate range of 10 to 80 degrees.

17. The method of claim 15 wherein said second angle is in the approximate range of 30 to 60 degrees.

18. The method of claim 15 wherein said second angle is about 45 degrees.

19. The method of claim 13 wherein said second angle is about 90 degrees.

20. The method of claim 19 wherein said first angle is in the approximate range of 10 to 80 degrees.

21. The method of claim 19 wherein said first angle is in the approximate range of 30 to 60 degrees.

22. The method of claim 19 wherein said first angle is about 45 degrees.

23. A method for making an endless power transmission belt having a trapezoidal cross-section comprising a belt body and a cord fabric cover layer, said cord fabric comprising a plurality of substantially parallel strength cords and a plurality of weak tie strands holding said strength cords in parallel relation, said cover layer surrounding said belt body with an overlap and bonded thereto, which comprises the steps of providing a belt body having a trapezoidal cross-section, providing a cord fabric having a layer of elastomeric material calendered to at least one side thereof, wrapping said belt body with a continuous width of said fabric by applying said fabric to the bottom of said belt with said strength cords disposed at a first angle to the longitudinal axis of said belt, pulling said fabric in shear whereby said strength cords are disposed at a desired second angle to said axis and applying said fabric to one side of said belt with said strength cords disposed at said second angle, continuing to apply said fabric to the top and the second side of said belt body with said strength cords disposed at said second angle, pulling said fabric in shear to an angle approximately equal in magnitude and opposite in direction to said first angle and applying the remainder of said width of said fabric to the bottom of said belt body; and curing the resulting wrapped belt body.

24. The method of claim 23 wherein said second angle is about 90 degrees.

25. The method of claim 24 wherein said first angle is in the approximate range of 10 to 80 degrees.

26. The method of claim 24 wherein said first angle is in the approximate range of 30 to 60 degrees.

27. The method of claim 24 wherein said first angle is about 45 degrees.

* * * * *